(12) United States Patent
Jeong et al.

(10) Patent No.: US 11,514,834 B2
(45) Date of Patent: *Nov. 29, 2022

(54) TILED DISPLAY DEVICE

(71) Applicant: SAMSUNG DISPLAY CO., LTD., Yongin-si (KR)

(72) Inventors: Jun Ki Jeong, Yongin-si (KR); Hyun Joon Kim, Yongin-si (KR); Kyung Bae Kim, Yongin-si (KR); Kyung Hoon Chung, Yongin-si (KR); Chong Chul Chai, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/231,492

(22) Filed: Apr. 15, 2021

(65) Prior Publication Data

US 2021/0231993 A1 Jul. 29, 2021

Related U.S. Application Data

(63) Continuation of application No. 16/534,430, filed on Aug. 7, 2019, now Pat. No. 10,983,381.

(30) Foreign Application Priority Data

Nov. 21, 2018 (KR) ........................ 10-2018-0144689

(51) Int. Cl.
*G09G 3/20* (2006.01)
*G02F 1/1333* (2006.01)
*F21V 8/00* (2006.01)

(52) U.S. Cl.
CPC ......... *G09G 3/2085* (2013.01); *G02B 6/0068* (2013.01); *G02F 1/13336* (2013.01); *G09G 2300/0408* (2013.01); *G09G 2300/0426* (2013.01); *G09G 2380/02* (2013.01)

(58) Field of Classification Search
CPC .. G02F 1/13336; G02B 6/0068; G09G 3/2085
See application file for complete search history.

(56) References Cited

U.S. PATENT DOCUMENTS

| 8,179,336 | B2 | 5/2012 | Hamer et al. |
| 9,575,241 | B2 | 2/2017 | Park |
| 9,704,429 | B2 | 7/2017 | Seo et al. |

(Continued)

FOREIGN PATENT DOCUMENTS

| KR | 10-1287899 | 5/2013 |
| KR | 10-2016-0099999 | 8/2016 |

(Continued)

*Primary Examiner* — Kevin M Nguyen
(74) *Attorney, Agent, or Firm* — F. Chau & Associates, LLC

(57) ABSTRACT

A tiled display device includes an array of a plurality of display panels. Each of the plurality of display panels includes a plurality of pixels constituting a plurality of pixel rows and a plurality of pixel columns, a data distributor disposed between a first pixel of a first pixel row among the plurality of pixel rows and a second pixel of the first pixel row adjacent to the first pixel in a first direction, and a scan driver disposed between the second pixel and a third pixel adjacent to the second pixel in the first direction.

20 Claims, 10 Drawing Sheets

(56) References Cited

U.S. PATENT DOCUMENTS

| | | | |
|---|---|---|---|
| 10,025,414 B2 | 7/2018 | Park et al. | |
| 10,120,227 B2 | 11/2018 | Yu et al. | |
| 10,468,397 B2 * | 11/2019 | Cok | H01L 27/14643 |
| 10,983,381 B2 * | 4/2021 | Jeong | G02B 6/0068 |
| 2017/0092171 A1 | 3/2017 | Knausz et al. | |
| 2017/0186365 A1 | 6/2017 | Yoneda | |
| 2017/0219864 A1 | 8/2017 | Jepsen et al. | |
| 2018/0174507 A1 | 6/2018 | Ohara et al. | |
| 2018/0218668 A1 | 8/2018 | Aoyagi et al. | |
| 2020/0159054 A1 | 5/2020 | Jeong et al. | |

FOREIGN PATENT DOCUMENTS

| | | |
|---|---|---|
| KR | 10-2016-0110737 | 9/2016 |
| KR | 10-2016-0110840 | 9/2016 |
| KR | 10-2017-0039030 | 4/2017 |
| KR | 10-2017-0080962 | 7/2017 |

\* cited by examiner

TILED DISPLAY DEVICE

CROSS-REFERENCE TO RELATED APPLICATION

This application claims priority under 35 U.S.C. § 119 to U.S. patent application Ser. No. 16/534,430 filed on Aug. 7, 2019 and to Korean Patent Application No. 10-2018-0144689, filed in the Korean Intellectual Property Office on Nov. 21, 2018, the disclosures of which are incorporated by reference herein in their entirety.

TECHNICAL FIELD

Exemplary embodiments of the inventive concept relate to a display device, and more particularly, to a tiled display device including a plurality of display panels.

DISCUSSION OF RELATED ART

Recently, tiled display devices having a plurality of display devices connected to make a large-screen display device have been put into practical use, and have been used for outdoor advertising and the like. Tiled display devices implement a large screen by fixing a plurality of display panels with a predetermined size to a mounting frame. A bezel is disposed at a boundary portion between the display panels, and when such a bezel is visually recognized, display quality of the tiled display device may deteriorate.

In particular, an image may be cut off at a connection portion between the display panels in which the bezel is disposed, and a discontinuity of the image may be visually recognized.

SUMMARY

According to an exemplary embodiment of the inventive concept, a tiled display device may include a plurality of display panels. Each of the plurality of display panels may include a plurality of pixels constituting a plurality of pixel rows and a plurality of pixel columns, a data distributor disposed between a first pixel of a first pixel row among the plurality of pixel rows and a second pixel of the first pixel row adjacent to the first pixel in a first direction, and a scan driver disposed between the second pixel and a third pixel adjacent to the second pixel in the first direction.

In an exemplary embodiment of the inventive concept, each of the plurality of pixels may include first to third subpixels that emit first to third colors, respectively.

In an exemplary embodiment of the inventive concept, the data distributor may include a first demultiplexer including first to third transistors respectively connected to the first to third subpixels of the first pixel, and a second demultiplexer including fourth to sixth transistors respectively connected to the first to third subpixels of the second pixel.

In an exemplary embodiment of the inventive concept, each of the first to third subpixels may include an inorganic light emitting element, and a pixel circuit connected to the inorganic light emitting element.

In an exemplary embodiment of the inventive concept, a first pixel circuit corresponding to a 2k−1-th pixel row and a second pixel circuit corresponding to a 2k-th pixel row may be disposed between a first inorganic light emitting element corresponding to the 2k−1-th pixel row and a second inorganic light emitting element corresponding to the 2k-th pixel row, where k is a natural number.

In an exemplary embodiment of the inventive concept, the first and second pixel circuits may not overlap the first and second inorganic light emitting elements.

In an exemplary embodiment of the inventive concept, scan lines connected to the 2k−1-th pixel row and the 2k-th pixel row may extend in the first direction between the 2k−1-th pixel row and the 2k-th pixel row.

In an exemplary embodiment of the inventive concept, a power line connected to the 2k−1-th pixel row and the 2k-th pixel row may extend in the first direction between the 2k-th pixel row and a 2k+1-th pixel row.

In an exemplary embodiment of the inventive concept, a power line connected to a 2j−1-th pixel row and a 2j-th pixel row may extend in the first direction between a 2j−2-th pixel row and a 2j−1-th pixel row, where j is a natural number greater than 1.

In an exemplary embodiment of the inventive concept, the scan driver may include a plurality of stages connected to the plurality of pixel rows, respectively.

In an exemplary embodiment of the inventive concept, the plurality of stages may be arranged in a second direction crossing the first direction between a pixel column including the second pixel and a pixel column including the third pixel.

In an exemplary embodiment of the inventive concept, the scan driver may include a plurality of scan drivers which are disposed between different pixel columns and are connected to different scan lines, and each of the plurality of scan drivers may include a plurality of stages arranged in a second direction crossing the first direction.

In an exemplary embodiment of the inventive concept, the scan driver may include a first scan driver configured to output an initialization scan signal, a second scan driver configured to output a write scan signal, and a third scan driver configured to output a bypass scan signal.

In an exemplary embodiment of the inventive concept, the data distributor and the scan driver may be disposed between different pixel columns.

In an exemplary embodiment of the inventive concept, each of the plurality of display panels may further include an emission driver which is disposed between pixel columns other than pixel columns in which the scan driver or the data distributor are disposed, and is connected to the plurality of pixels.

In an exemplary embodiment of the inventive concept, each of the plurality of display panels may further include a data driver which is disposed opposite a light emitting surface in which an image is displayed by the plurality of pixels and is configured to supply a data signal to each of the plurality of pixels.

In an exemplary embodiment of the inventive concept, the data driver may be electrically connected to the plurality of pixels through the data distributor.

According to an exemplary embodiment of the inventive concept, a tiled display device may include an array of a plurality of display panels. Each of the plurality of display panels may include a plurality of pixels which constitute first to n-th pixel rows and first to m-th pixel columns, where each of the plurality of pixels may include a pixel circuit and an inorganic light emitting element connected to the pixel circuit, a demultiplexer disposed between a 2k−1-th pixel of an i-th pixel row and a 2k-th pixel of the i-th pixel row, and a scan driver including a plurality of stages arranged in a column direction between a 2k-th pixel column and a 2k+1-th pixel column. The pixel circuit of each of the plurality of pixels of the n-th pixel row may be disposed closer to the n−1-th pixel row than the inorganic light emitting element of each of the plurality of pixels of the n-th pixel row, where n and m are natural numbers, i is a natural number less than or equal to n, and k is a natural number less than or equal to n/2.

In an exemplary embodiment of the inventive concept, transistors included in the pixel circuit and the inorganic light emitting element may not overlap each other.

In an exemplary embodiment of the inventive concept, pixel circuits corresponding to a 2k−1-th pixel row and pixel circuits corresponding to a 2k-th pixel row may be disposed between inorganic light emitting elements corresponding to the 2k−1-th pixel row and inorganic light emitting elements corresponding to the 2k-th pixel row.

According to an exemplary embodiment of the inventive concept, a tiled display device may include an array of a plurality of display panels, where each of the plurality of display panels may include a plurality of pixels constituting a plurality of pixel rows and a plurality of pixel columns. A first pixel of the plurality of pixels may include a first pixel circuit and a first inorganic light emitting element. A second pixel of the plurality of pixels adjacent to the first pixel in a pixel column direction may include a second pixel circuit and a second inorganic light emitting element. A third pixel of the plurality of pixels adjacent to the first pixel in a pixel row direction may include a third pixel circuit and a third inorganic light emitting element. The first pixel circuit and the second pixel circuit may be disposed between the first inorganic light emitting element and the second inorganic light emitting element. A demultiplexer may be disposed and connected between the first inorganic light emitting element and the third inorganic light emitting element.

BRIEF DESCRIPTION OF THE DRAWINGS

The above and other features of the inventive concept will become more apparent by describing in detail exemplary embodiments thereof with reference to the accompanying drawings.

DETAILED DESCRIPTION OF THE EMBODIMENTS

Figure 1:
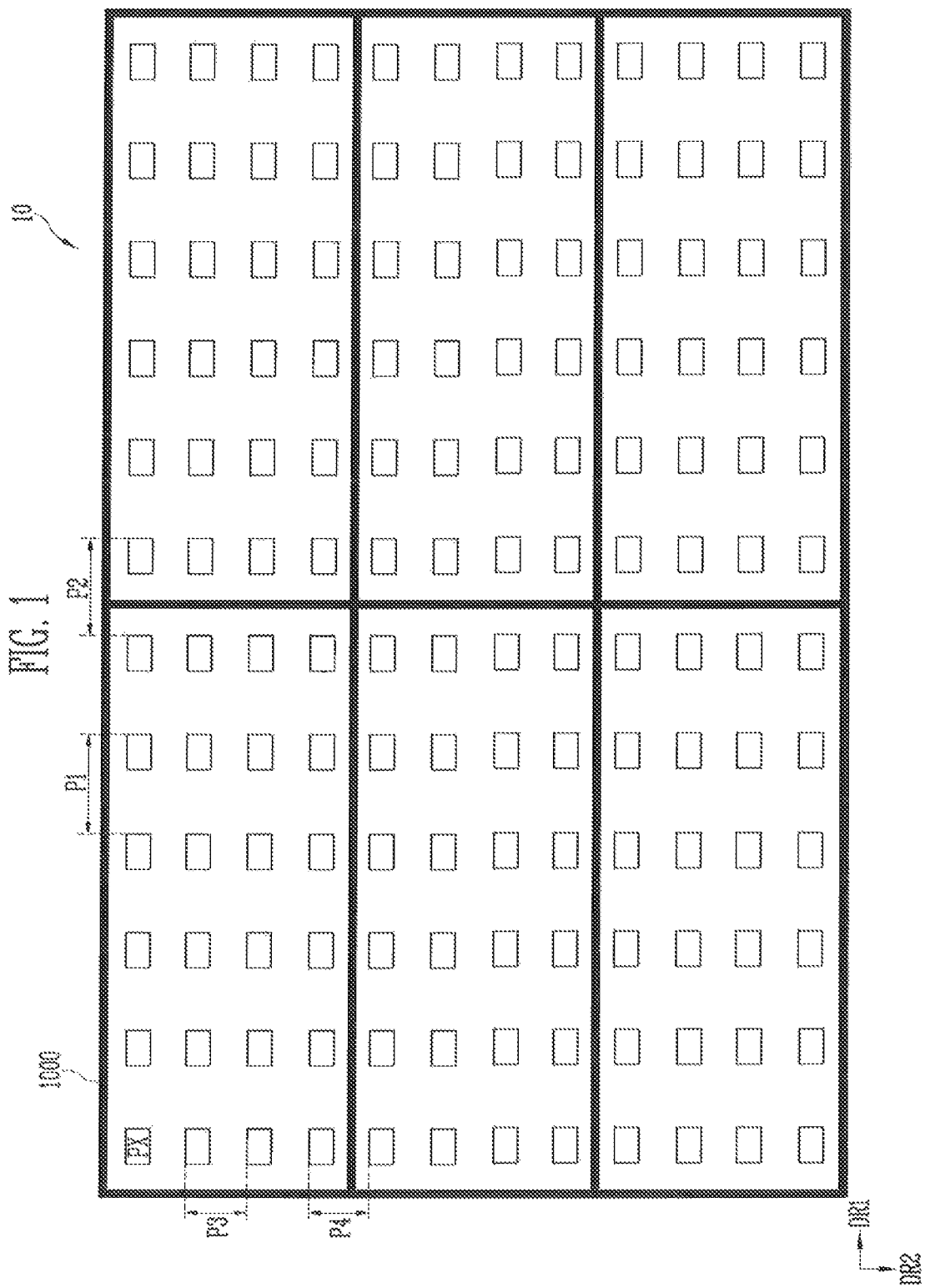
FIG. 1 is a drawing illustrating a tiled display device according to an exemplary embodiment of the inventive concept.

Exemplary embodiments of the inventive concept provide a tiled display device including a plurality of display panels having a data distributor and a scan driver disposed between different pixels.

Exemplary embodiments of the inventive concept will be described more fully hereinafter with reference to the accompanying drawings. Like reference numerals may refer to like elements throughout this application.

Figure 2:
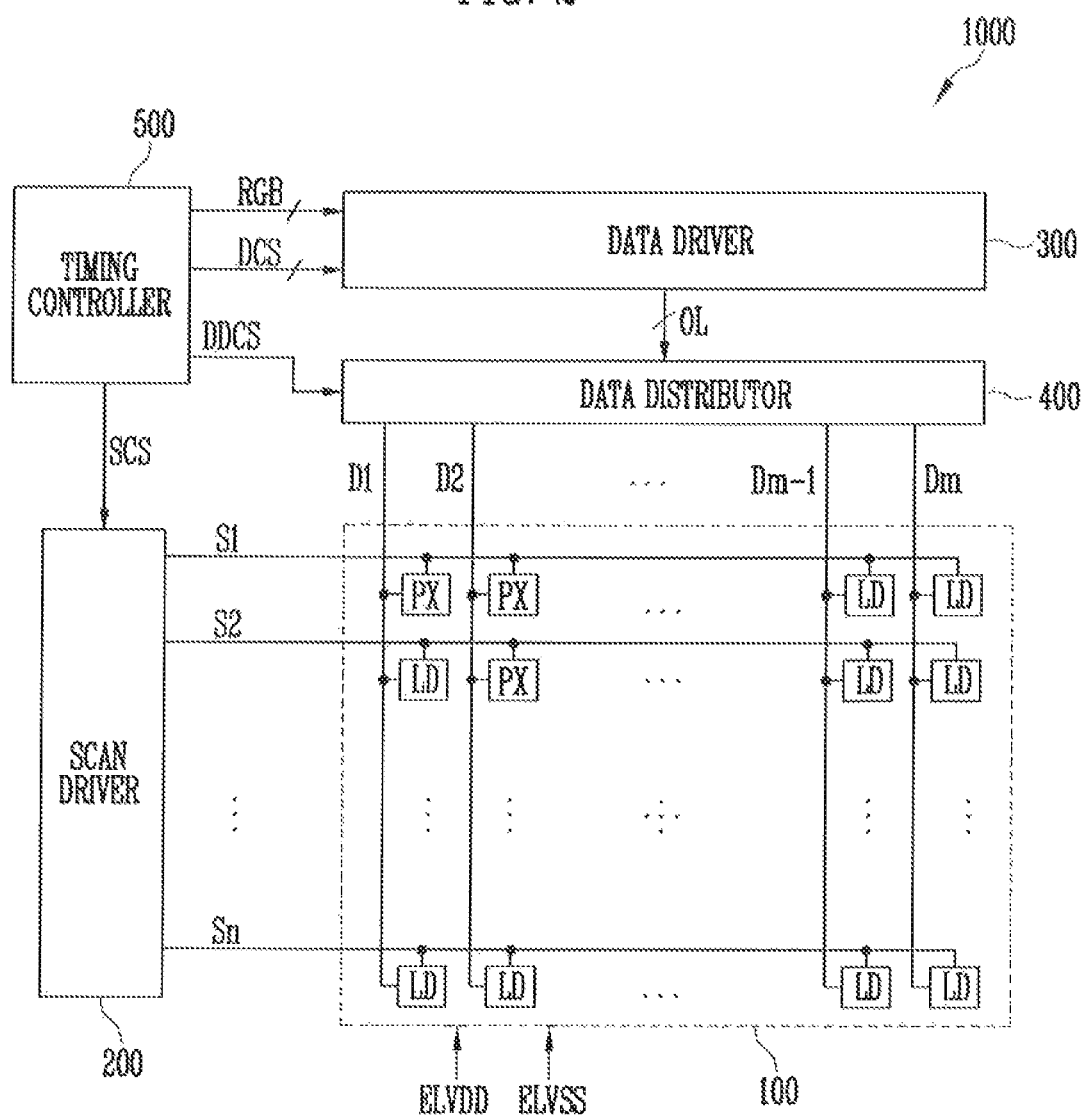
FIG. 2 is a block diagram illustrating a display panel included in the tiled display device of FIG. 1 according to an exemplary embodiment of the inventive concept.

FIG. 1 is a drawing illustrating a tiled display device according to an exemplary embodiment of the inventive concept, and FIG. 2 is a block diagram illustrating a display panel included in the tiled display device of FIG. 1 according to an exemplary embodiment of the inventive concept.

Referring to FIGS. 1 and 2, a tiled display device 10 may include a plurality of display panels 1000.

The tiled display device 10 may be formed of two or more display panels 1000 connected to each other. The display panels 1000 of three rows and two columns are connected in FIG. 1, but an arrangement and a number of the display panels 1000 included in the tiled display device 10 are not limited thereto.

Each of the display panels 1000 may include the plurality of pixels PX. In an exemplary embodiment of the inventive concept, the display panel 1000 may include a display area 100 including pixels PX, a scan driver 200, a data driver 300, a data distributor 400, and a timing controller 500.

The display area 100 may include a plurality of pixels PX. The display area 100 may be connected to the scan driver 200 through a plurality of scan lines S1 to Sn, and may be connected to the data distributor 400 and the data driver 300 through a plurality of data lines D1 to Dm.

In an exemplary embodiment of the inventive concept, the pixels PX may be disposed on the front of the display panel 1000 to form a light emitting surface. The pixels PX may constitute a plurality of pixel rows and a plurality of pixel columns. Here, the pixel rows may refer to a pixel group connected to the same scan line, and the pixel columns may refer to a pixel group connected to the same data line. In other words, the display area 100 may include m pixel rows (where m is a positive integer) respectively connected to the data lines D1 to Dm, and n pixel columns (where n is a positive integer) respectively connected to the scan lines S1 to Sn.

The scan driver 200 may provide a scan signal to the pixels PX through the plurality of scan lines S1 to Sn based on a first control signal SCS. In an exemplary embodiment of the inventive concept, each of the scan lines S1 to Sn may be connected to the pixels PX disposed in a corresponding pixel row.

The data driver 300 may provide a data signal to the data distributor 400 through a plurality of output lines OL based on a second control signal DCS. In an exemplary embodiment of the inventive concept, the data driver 300 may generate a data signal corresponding to image data RGB and may supply the data signal to the data distributor 400.

The data distributor 400 may selectively supply (e.g., provide by time-division) the data signal to the data lines D1 to Dm connected to each of the pixels PX based on a third control signal DDCS. In an exemplary embodiment of the inventive concept, the data distributor 400 may include a plurality of demultiplexers. For example, each demultiplexer may transfer the data signal received from the data driver 300 to one of the data lines D1 to Dm through m switches (e.g., metal oxide semiconductor (MOS) transistors) from one output line OL.

In an exemplary embodiment of the inventive concept, each of the data lines D1 to Dm may be connected to the pixels PX disposed in a corresponding pixel column.

The timing controller 500 may receive an RGB image signal, a vertical synchronization signal, a horizontal synchronization signal, a main clock signal, and a data enable signal from an external graphic controller, and may generate the first control signal SCS, the second control signal DCS, the third control signal DDCS, and the image data RGB corresponding to the RGB image signal based on signals thereof. The timing controller 500 may supply the first control signal SCS to the scan driver 200, may supply the second control signal DCS and the image data RGB to the data driver 300, and may supply the third control signal DDCS to the data distributor 400.

First distances P1 (e.g., pitches) in a first direction DR1 of the pixels PX in the display panel 1000 may be substantially uniform. For example, pixels PX1 may be disposed at a substantially equal interval of the first distance P1 with respect to the first direction DR1. A distance between the closest pixels PX of adjacent display panels 1000 in the first direction DR1 may be referred to as a second distance P2.

In an exemplary embodiment of the inventive concept, the first direction DR1 may be a horizontal direction, and a second direction DR2 may be a vertical direction.

In an exemplary embodiment of the inventive concept, the first distance P1 and the second distance P2 may be formed to be substantially the same. For this purpose, stages constituting the scan driver 200 may be disposed between predetermined pixels PX. Therefore, a dead space of the outside (e.g., left and right sides of the display panel 1000) of the display area 100 in which the scan driver 200 is disposed may be removed, and left and right boundaries between the display panels 1000 may be freely controlled.

A distance P3 in the second direction DR2 of the pixels PX in the display panel 1000 may be referred to as a third distance P3, and a distance between the closest pixels PX of adjacent display panels 1000 in the second direction DR2 may be referred to as a fourth distance P4.

In an exemplary embodiment of the inventive concept, the third distance P3 and the fourth distance P4 may be formed to be substantially the same. For this purpose, demultiplexers constituting the data distributor 400 may be disposed between predetermined pixels PX. Therefore, a dead space of the outside (e.g., upper and/or lower sides of the display panel 1000) of the display area 100 may be removed, and upper and lower boundaries between the display panels 1000 may be freely controlled.

In an exemplary embodiment of the inventive concept, the first to fourth distances P1 to P4 may be substantially the same. In other words, horizontal distances and/or vertical distances between all pixels PX included in the tiled display device 10 may be substantially uniform. For example, the horizontal distance and/or vertical distance between adjacent pixels PX between adjacent display panels 1000 may be substantially the same as the horizontal distance and/or vertical distance between pixels PX included in one display panel 1000.

Arrangement of the pixels PX and some constituent elements of the display panel 1000 will be described in detail with reference to FIGS. 3 to 10.

Figure 3:
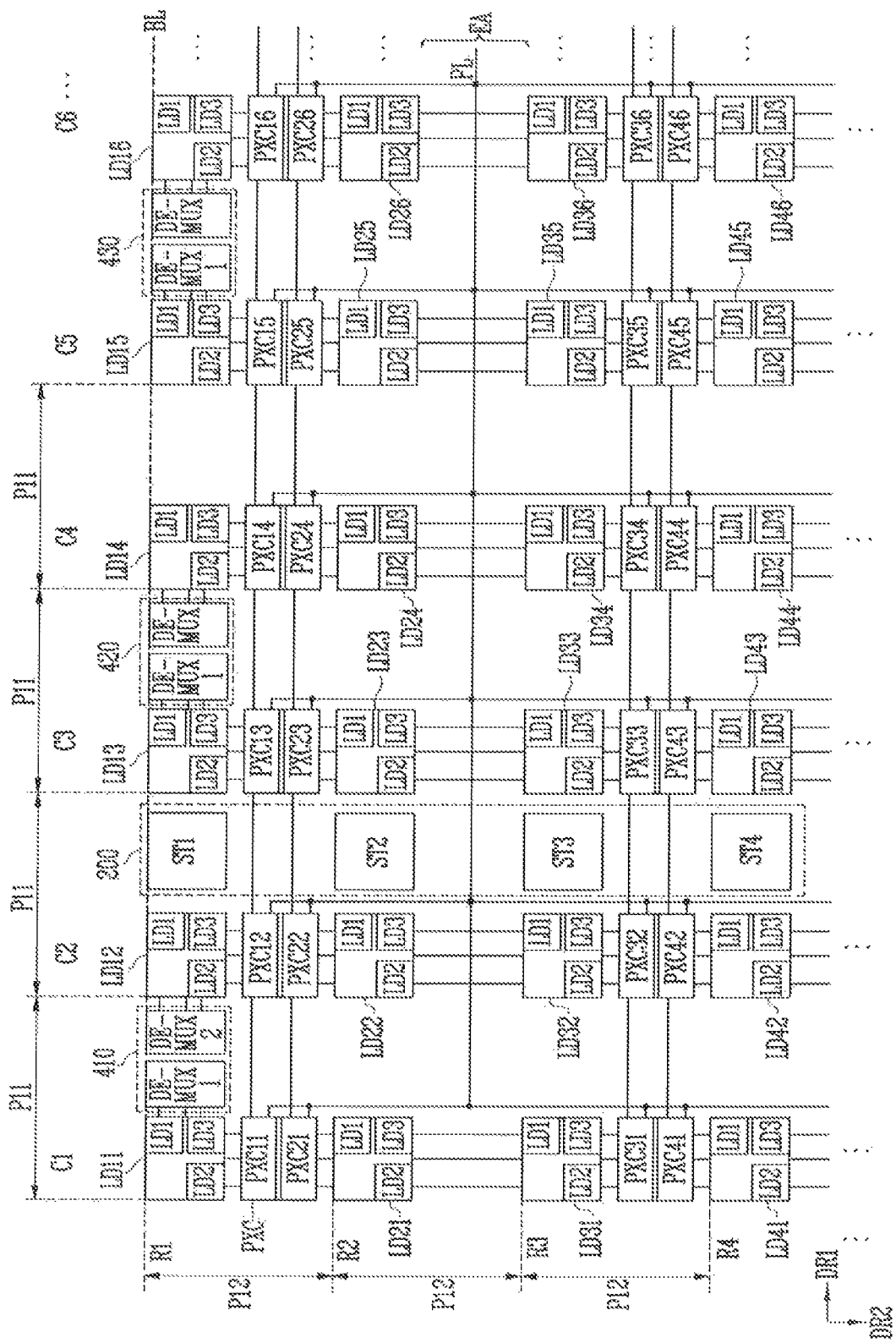
FIG. 3 is a drawing illustrating the display panel of FIG. 2 according to an exemplary embodiment of the inventive concept.

FIG. 3 is a drawing illustrating the display panel of FIG. 2 according to an exemplary embodiment of the inventive concept.

Referring to FIGS. 1 to 3, the display panel 1000 may include the pixels PX, a data distributor 410, 420, and 430, and a scan driver 200.

FIG. 3 illustrates only a portion of the display panel 1000, and the arrangement of constituent elements of FIG. 3 may extend to the entire display panel 1000.

The pixels PX may form first to fourth pixel rows R1 to R4 and first to fourth pixel columns C1 to C4. In an exemplary embodiment of the inventive concept, each pixel PX may include first to third subpixels emitting first to third colors, respectively. For example, each of the first to third colors may be one of red, green, and blue. However, this is an example, and a color, number, and/or type of subpixels included in one pixel PX is not limited thereto.

Each of the first to third subpixels may include inorganic light emitting elements LD1 to LD3 and a pixel circuit PXC connected to the inorganic light emitting elements LD1 to LD3.

In an exemplary embodiment of the inventive concept, each of the inorganic light emitting elements LD1 to LD3 is an active element that emits one of the first to third colors, and may be manufactured in the form of a chip.

In an exemplary embodiment of the inventive concept, the inorganic light emitting elements LD1 to LD3 may be very small (e.g., nano scale to microscale) light emitting elements using an inorganic crystal structure material. For example, each of the inorganic light emitting elements LD1 to LD3 may be a very small rod-type light emitting element that emits one of the first to third colors, or a set of light emitting elements thereof.

The inorganic light emitting elements LD1 to LD3 corresponding to the subpixels may form, for example, light emitting element groups LD11 to LD46 corresponding to the pixels PX.

In addition, an arrangement form of the inorganic light emitting elements LD1 to LD3 is not limited to an arrangement form of FIG. 3. For example, the inorganic light emitting elements LD1 to LD3 may be arranged in a stripe form or may have various known pixel arrangement structures.

FIG. 3 schematically illustrates the pixel circuit PXC, but the pixel circuit PXC may include three of the same pixel circuits connected to the inorganic light emitting elements LD1 to LD3, respectively. The pixel circuit PXC and the inorganic light emitting elements LD1 to LD3 may be formed on different layers of a substrate of the display panel 1000. In an exemplary embodiment of the inventive concept, the inorganic light emitting elements LD1 to LD3 may be disposed above the pixel circuit PXC and may be connected to the pixel circuit PXC through a predetermined conductive pattern.

In an exemplary embodiment of the inventive concept, the pixel circuit PXC and the inorganic light emitting elements LD1 to LD3 do not overlap each other. The inorganic light emitting elements LD1 to LD3 may generate a high temperature when emitting light. Due to the high temperature generated from the inorganic light emitting elements LD1 to LD3, characteristic changes of transistors of the pixel circuit PXC may be a concern. Therefore, the pixel circuit PXC and the inorganic light emitting elements LD1 to LD3 may be formed not to overlap each other.

In an exemplary embodiment of the inventive concept, the pixel circuit PXC corresponding to each of the pixels PX of the 2k−1-th pixel row (where k is a natural number less than or equal to n/2) and the pixels PX of 2k-th pixel row may be disposed between the inorganic light emitting element LD1 to LD3 corresponding to each of the pixels PX of the 2k−1-th pixel row and the inorganic light emitting elements LD1 to LD3 corresponding to each of the pixels PX of the 2k-th pixel row. For example, pixel circuits PXC11 to PXC16 of the pixels PX of the first pixel row R1 and pixel circuits PXC21 to PXC26 of the pixels PX of the second pixel row R2 may be disposed between light emitting element groups LD11 to LD16 of the pixels PX of the first pixel row R1 and light emitting element groups LD21 to LD26 of the pixels PX of the second pixel row R2.

Accordingly, pixel circuits PXC of the last or bottom pixel row, for example, the n-th pixel row, may be disposed at the upper side of the light emitting element groups of the n-th pixel row. Therefore, a dead space at the lower side of the display area 100 may be reduced.

A distance between the pixel PX corresponding to the light emitting element group LD11 and the pixel PX corresponding to the light emitting element group LD21 according to the disposition of the pixel circuit PXC may have a second distance P12. In an exemplary embodiment of the inventive concept, a distance between pixels PX in the second direction DR2 may be a distance (e.g., distance between first inorganic light emitting elements LD1) between the same inorganic light emitting elements of adjacent pixels in the second direction DR2. The second distance P12 may refer to an interval between the pixels PX in the second direction DR2. In other words, the pixels PX of the same pixel column may be disposed at a substantially equal interval with the second distance P12 in the second direction DR2.

The pixel circuit PXC is not disposed between the second pixel row R2 and the third pixel row R3 due to the disposition of the pixel circuits PXC described above. A region in which pixel circuits PXC are not disposed in a region between adjacent pixel rows may be referred to as a first region EA. In the first region EA, a power line PL which supplies power for driving the pixels PX may be disposed in the first direction DR1. The power line PL may be branched corresponding to each pixel column to supply the power to each pixel PX.

In an exemplary embodiment of the inventive concept, the data distributors 410, 420, and 430 may be disposed between the 2k−1-th pixel and the 2k-th pixel of the first pixel row R1. In an exemplary embodiment of the inventive concept, the data distributors 410, 420, and 430 may include demultiplexers. For example, the data distributor 410 may include a first demultiplexer corresponding to the first pixel column C1 and a second demultiplexer corresponding to the second pixel column C2.

Specifically, the data distributor 410, which is disposed between the first pixel corresponding to the first pixel row R1 and the first pixel column C1 and the second pixel corresponding to the first pixel row R1 and the second pixel column C2, may supply data signals to each of data lines connected to the first pixel column C1 and the second pixel column C2 by time division. For example, since each of the pixels PX includes three subpixels, the first pixel column C1 may be connected to the first demultiplexer through three data lines.

In an exemplary embodiment of the inventive concept, the top ends of the data distributors 410, 420, and 430 may be disposed so as not to deviate from the top ends of the inorganic light emitting elements LD1 to LD3 of the first pixel row R1. The top end in which the light emitting element groups LD11 to LD16 of the first pixel row R1 are disposed may be referred to as a virtual boundary line BL. Here, the data distributors 410, 420, and 430 may be formed so as not to deviate from the virtual boundary line BL in the opposite direction of the second direction DR2. For example, the data distributors 410, 420, and 430 may be disposed at the lower side of the virtual boundary line BL. Thus, a dead space at the upper side of the first pixel row R1 of the display panel 1000 may be minimized by disposing the data distributors 410, 420, and 430 between the pixels PX.

However, this is an example, and the data distributors 410, 420, and 430 may be disposed corresponding to the n-th pixel row (e.g., bottom pixel row). Further, the data distributors 410, 420, and 430 may be disposed at a position corresponding to the i-th pixel row (where i is a natural number less than or equal to n), and at least one of the data distributors 410, 420, and 430 may be disposed at positions corresponding to different pixel rows.

A distance between the pixel PX corresponding to the light emitting element group LD11 and the pixel PX corresponding to the light emitting element group LD12 according to the disposition of the data distributors 410, 420, and 430 may have a first distance P11. In an exemplary embodiment of the inventive concept, a distance between pixels in the first direction DR1 may be a distance (e.g., a distance between second inorganic light emitting elements LD2) between the same inorganic light emitting elements of adjacent pixels to the first direction DR1. The first distance P11 may refer to an interval between the pixels PX in the first direction DR1. In other words, the pixels PX of the same pixel row may be disposed at a substantially equal interval with the first distance P11 in the first direction DR1. Here, the first distance P11 and the second distance P12 may be substantially the same or may be substantially different.

The data distributors 410, 420, and 430 are not disposed between the 2k-th pixel column and the 2k+1-th pixel column due to the disposition described above. For example, the data distributors 410, 420, and 430 are not disposed between the second pixel column C2 and the third pixel column C3.

The scan driver 200 may be disposed in some of portions between the pixel columns in which the data distributors 410, 420, and 430 are not disposed. In an exemplary embodiment of the inventive concept, the scan driver 200 may be integrated on the substrate of the display panel 1000.

As shown in FIG. 3, the scan driver 200 may be disposed between the second pixel row C2 and the third pixel row C3.

The scan driver 200 may include a plurality of stages ST1 to ST4 connected to the first to fourth pixel rows R1 to R4 through scan lines S1 to S4, respectively. In an exemplary embodiment of the inventive concept, the stages ST1 to ST4 may be disposed between the second pixel column C2 and the third pixel column C3 in the second direction DR2. However, this is an example, and the arrangement of the scan driver 200 and the stages ST1 to ST4 is not limited thereto. For example, the stages ST1 to ST4 may be disposed between the 2k-th pixel column and the 2k+1-th pixel column where the data distributors 410, 420, and 430 are not disposed.

In an exemplary embodiment of the inventive concept, the stages ST1 to ST4 may be connected to one another in a dependent manner and may sequentially supply a scan signal to the scan lines S1 to S4 in response to a control signal (e.g., a scan start signal).

In an exemplary embodiment of the inventive concept, the 2k−1-th scan line and the 2k-th scan line may extend between the light emitting element groups of the 2k−1-th pixel row and the light emitting element groups of the 2k-th pixel row in the first direction DR1. For example, a first scan line S1 and a second scan line S2 may extend between the light emitting element groups LD11 to LD16 and the light emitting element groups LD21 to LD26 in the first direction DR1.

FIG. 3 illustrates that vertical widths of the stages ST1 to ST4 are substantially the same as vertical widths of the light emitting element groups LD11 to LD46, but sizes of the stages ST1 to ST4 are not limited thereto.

The first stage ST1 may be formed so as not to deviate from the virtual boundary line BL in the opposite direction of the second direction DR2. For example, the first stage ST1 may be disposed at the lower side of the virtual boundary line BL.

As described above, since the scan driver 200 is arranged between the predetermined pixels PX, a dead space at the left side and/or right side of the display panel 1000 may be minimized.

As described above, the tiled display device 10 according to exemplary embodiments of the inventive concept may include the plurality of display panels 1000 in which the data distributor 400, the scan driver 200, and the pixel circuits PXC are disposed between predetermined pixels PX (or between the light emitting element groups LD11 to LD46). Therefore, a dead space outside the display area 100 may be minimized.

Accordingly, the light emitting element groups LD11 to LD46 may be arranged in a regular pattern in which vertical intervals and/or horizontal intervals are uniform in the display panels 1000 that are continuously connected. In other words, intervals between all the pixels of the entire tiled display device 10 are formed at substantially equal intervals so that image deviation is minimized and a bezel and a connection portion (e.g., a boundary portion) between the display panels 1000 may not be recognized.

Figure 4A:
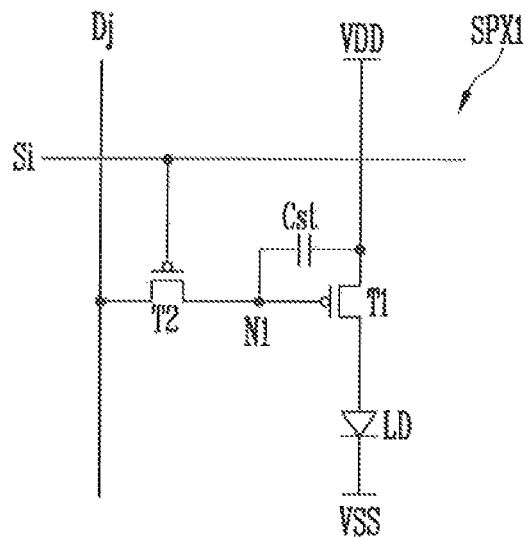
FIGS. 4A and 4B are circuit diagrams illustrating pixels included in the display panel of FIG. 2 according to an exemplary embodiment of the inventive concept.
Figure 4B:
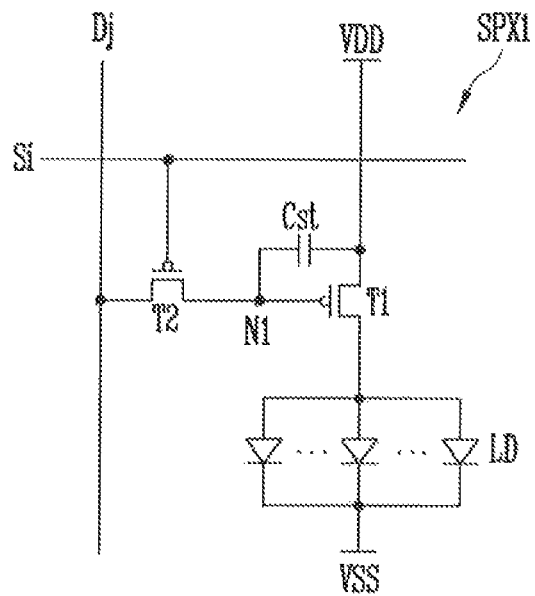

FIGS. 4A and 4B are circuit diagrams illustrating pixels included in the display panel of FIG. 2 according to an exemplary embodiment of the inventive concept.

FIGS. 4A and 4B illustrate one of the first to third subpixels. The first to third subpixels may have substantially the same or similar structures. Hereinafter, the term "subpixel SPX1" refers to any subpixel of the first to third subpixels or refers to the first to third subpixels collectively.

In an exemplary embodiment of the inventive concept, as shown in FIG. 4A, the subpixel SPX1 may include an inorganic light emitting element LD for generating light of a luminance corresponding to a data signal, and a first transistor T1, a second transistor T2, and a storage capacitor Cst for driving the inorganic light emitting element LD. First and second power supplies VDD and VSS may have different potentials so that the inorganic light emitting element LD may emit light. For example, the first power supply VDD may be set to a high potential power supply, and the second power supply VSS may be set to a low potential power supply.

In an exemplary embodiment of the inventive concept, as shown in FIG. 4B, the subpixel SPX1 may include a plurality of inorganic light emitting elements LD, the first transistor T1, the second transistor T2, and the storage capacitor Cst for driving the inorganic light emitting elements LD. FIG. 4B illustrate an exemplary embodiment in which the light emitting elements LD are connected in parallel in the same direction (e.g., forward direction) between the first power supply VDD and the second power supply VSS, but the inventive concept is not limited thereto. For example, in an exemplary embodiment of the inventive concept, some of the inorganic light emitting elements LD may be connected in the forward direction between the first and second power supplies VDD and VSS, while others may be connected in a reverse direction.

According to an exemplary embodiment of the inventive concept, one terminal of the inorganic light emitting element LD may be connected to the first transistor T1 and may be connected to the first power supply VDD through the first transistor T1. The other terminal of the inorganic light emitting element LD may be connected to the second power supply VSS.

The subpixel SPX1 may be connected to the corresponding scan line S1 and data line Dj.

The first transistor T1 (e.g., driving transistor) is connected between the first power supply VDD and a first electrode of the inorganic light emitting element LD or the plurality of inorganic light emitting elements LD. A gate electrode of the first transistor T1 is connected to a first node N1. The first transistor T1 controls a driving current supplied to the inorganic light emitting elements LD in response to the voltage of the first node N1.

The second transistor T2 (e.g., switching transistor) is connected between the data line Dj and the first node N1. A gate electrode of the second transistor T2 is connected to the scan line S1.

This second transistor T2 is turned on when a scan signal of a gate-on voltage (e.g., low voltage) is supplied from the scan line S1 to electrically connect the data line Dj and the first node N1. Accordingly, a voltage corresponding to the data signal is charged to the storage capacitor Cst.

One electrode of the storage capacitor Cst is connected to the first power supply VDD, and the other electrode of the storage capacitor Cst is connected to the first node N1.

In FIGS. 4A and 4B, the transistors included in the subpixel SPX1, for example, the first and second transistors T1 and T2, are illustrated as P-type transistors, but the inventive concept is not limited thereto. In other words, at least one of the first and second transistors T1 and T2 may be changed to an N-type transistor.

Figure 5:
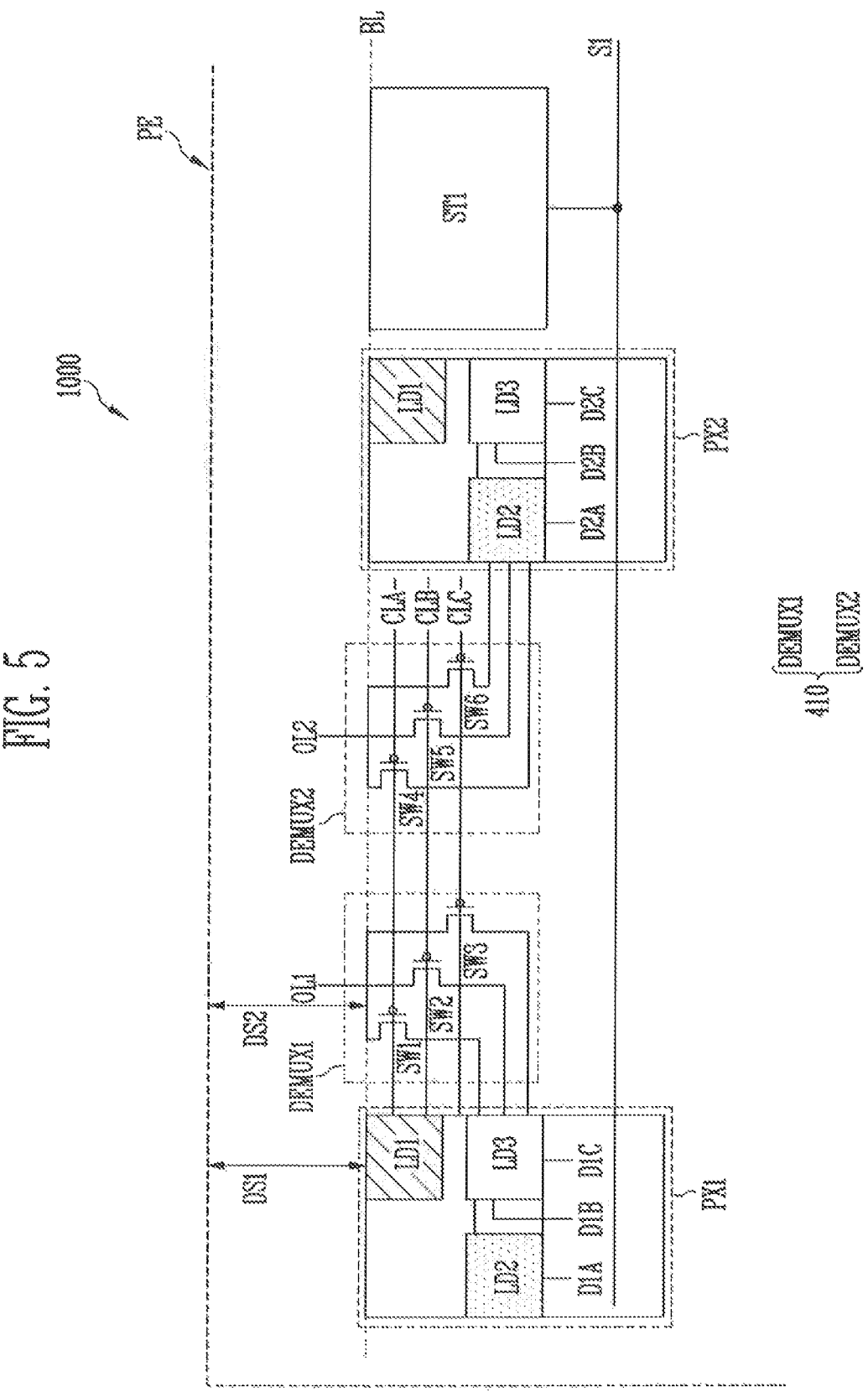
FIG. 5 is a drawing illustrating a portion of the display panel of FIG. 2 according to an exemplary embodiment of the inventive concept.

FIG. 5 is a drawing illustrating a portion of the display panel of FIG. 2 according to an exemplary embodiment of the inventive concept.

Referring to FIGS. 2 to 5, the data distributor 410 may include a first demultiplexer DEMUX1 and a second demultiplexer DEMUX2.

Here, the data distributor 410 may be a portion of the data distributor 400 of FIG. 2.

The first and second demultiplexers DEMUX1 and DEMUX2 may be disposed between the first pixel PX1 and the second pixel PX2. The first demultiplexer DEMUX1 may be connected to the first pixel PX1 and the second demultiplexer DEMUX2 may be connected to the second pixel PX2.

In an exemplary embodiment of the inventive concept, each of the first and second pixels PX1 and PX2 may include first to third subpixels. The first to third subpixels may include first to third light emitting elements LD1 to LD3. The first pixel PX1 may include first to third pixel circuits PXC11, and the second pixel PX2 may include first to third pixel circuits PXC12. Here, the first to third pixel circuits PXC11 and PXC12 may have substantially the same or a similar structure.

The first demultiplexer DEMUX1 may be connected to a first output line OL1 from the data driver 300. The first demultiplexer DEMUX1 may include first to third transistors SW1 to SW3 connected to the first to third subpixels of the first pixel PX1, respectively. First electrodes of the first to third transistors SW1 to SW3 may be commonly connected to the first output line OL1 and second electrodes of the first to third transistors SW1 to SW3 may be respectively connected to the first to third pixel circuits PXC11.

The first demultiplexer DEMUX1 may selectively supply data signals to first to third data lines D1A, D1B, and D1C based on first to third selection signals CLA, CLB, and CLC that respectively select the first to third data lines D1A, D1B, and D1C connected to the first pixel PX1. The first to third data lines D1A, D1B, and D1C may be connected to the first to third pixel circuits PXC11, respectively.

Likewise, the second demultiplexer DEMUX2 may selectively supply data signals to first to third data lines D2A, D2B, and D2C based on the first to third selection signals CLA, CLB, and CLC that respectively select first to third data lines D2A, D2B, and D2C connected to the second pixel PX2. The first to third data lines D2A, D2B, and D2C may be connected to the first to third pixel circuits PXC12, respectively.

In an exemplary embodiment of the inventive concept, the top ends of the first and second demultiplexers DEMUX1 and DEMUX2 may be disposed so as not to deviate from the top ends of the light emitting element groups LD11 and LD12 of the first pixel row R1. The top end in which the light emitting element groups LD11 to LD16 of the first pixel row R1 are disposed may be referred to as the virtual boundary line BL. For example, a distance DS2 between an upper boundary PE of the display panel 1000 and the data distributor 410 may be shorter than or equal to a distance DS1 between the upper boundary PE of the display panel 1000 and the first pixel PX1.

Likewise, the first stage ST1 of the scan driver 200 may be disposed so as not to deviate from the virtual boundary line BL. In other words, a distance between the scan driver 200 and the upper boundary PE of the display panel 1000 may be shorter than or equal to the distance DS1 between the upper boundary PE of the display panel 1000 and the first pixel PX1.

Accordingly, a dead space at the upper side of the first pixel row R1 of the display panel 1000 may be minimized.

Figure 6A:
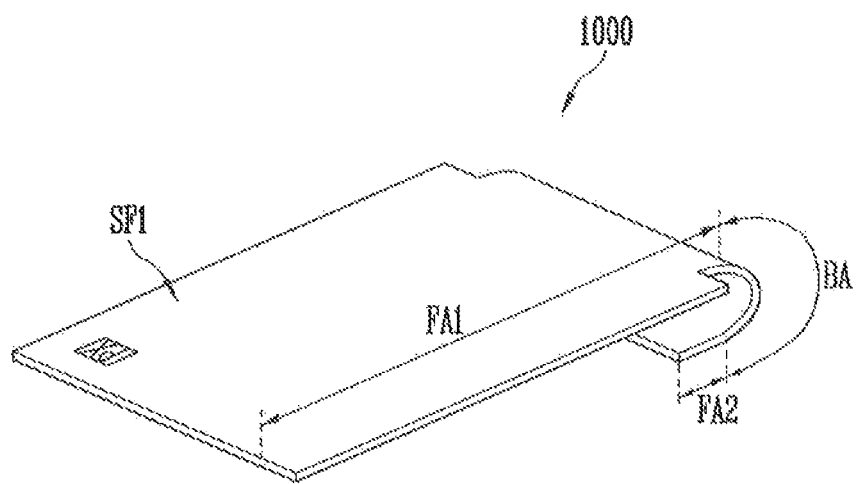
FIG. 6A is a drawing illustrating a first side of a substrate included in the display panel of FIG. 2 according to an exemplary embodiment of the inventive concept.
Figure 6B:
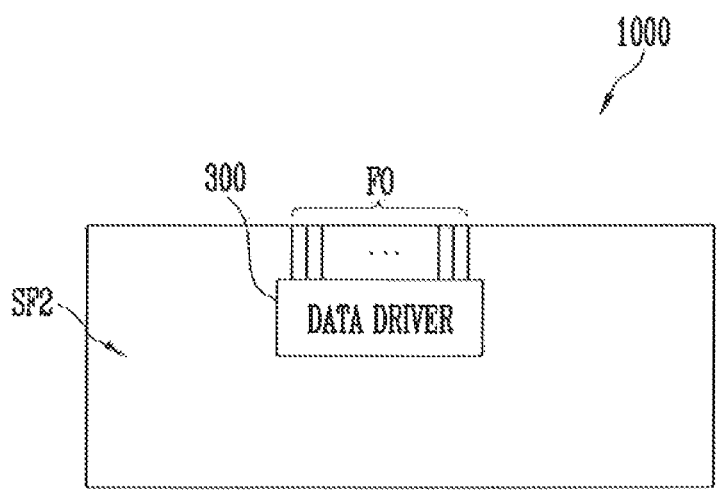
FIG. 6B is a drawing illustrating a second side of a substrate included in the display panel of FIG. 2 according to an exemplary embodiment of the inventive concept.

FIG. 6A is a drawing illustrating a first side of a substrate included in the display panel of FIG. 2 according to an exemplary embodiment of the inventive concept, and FIG. 6B is a drawing illustrating a second side of the substrate included in the display panel of FIG. 2 according to an exemplary embodiment of the inventive concept.

Referring to FIGS. 1, 2, 3, 6A and 6B, the display panel 1000 may include the display area 100, the scan driver 200, the data driver 300, the data distributor 400, and the timing controller 500.

In an exemplary embodiment of the inventive concept, a first flat region FA1 and a second flat region FA2 spaced apart from each other with a bending region BA therebetween may be provided in the display panel 1000, and the first flat region FA1 may include a display region. In addition, in an exemplary embodiment of the inventive concept, the bending region BA may be spaced apart from the display region.

The pixels PX may be disposed on a first side SF1 of the display panel 1000 including the display region. In an exemplary embodiment of the inventive concept, the data distributor 400 and scan driver 200 may be disposed between predetermined pixels PX in the display region.

Accordingly, a dead space in the first flat region FA1 of the display panel 1000 may be minimized.

As shown in FIG. 6B, the data driver 300 may be disposed on an opposite side SF2 of the first side SF1 (e.g., a light emitting surface). For example, the data driver 300 may be provided on the second flat region FA2.

For example, the data driver 300 and/or the timing controller 500 may be disposed in the form of a chip-on film on the second flat region FA2. A pad connecting the output lines OL and the data driver 300 may be disposed on the second flat region FA2. The output lines OL extending from the data driver 300 may be connected to the data distributor 400 of the first flat region FA1 through a fanout region FO.

As described above, the data driver 300 and/or the timing controller 500 may be disposed on the opposite side SF2 of the first side SF1 of the display panel 1000, thus reducing the dead space.

Figure 7:
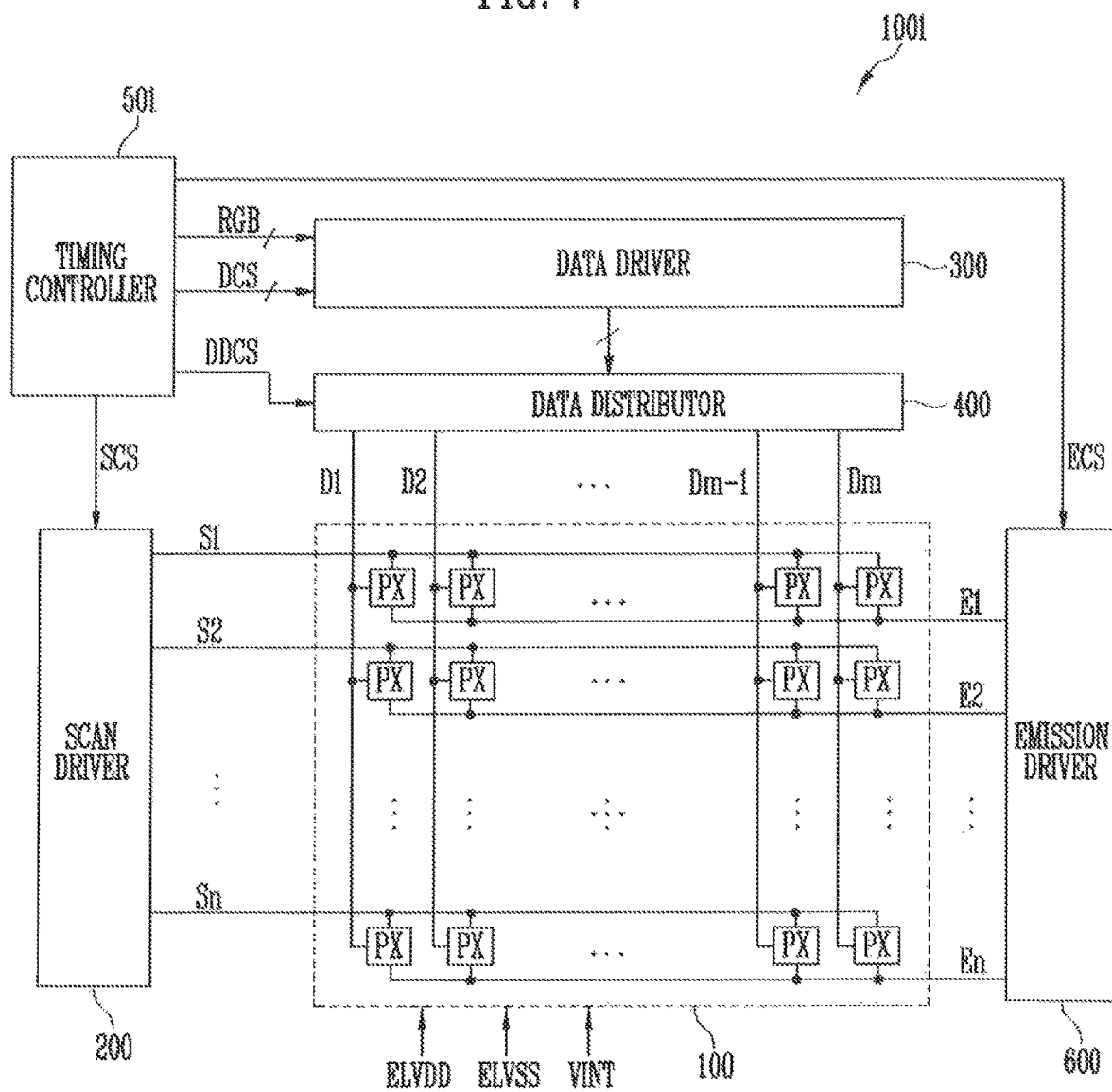
FIG. 7 is a block diagram illustrating a display panel included in the tiled display device of FIG. 1 according to an exemplary embodiment of the inventive concept.

FIG. 7 is a block diagram illustrating a display panel included in the tiled display device of FIG. 1 according to an exemplary embodiment of the inventive concept.

Since the display panel of FIG. 7 is substantially the same as the display panel of FIGS. 2 to 4B except for configuration of the emission driver, the same reference numerals are used for the same or corresponding constituent elements, and duplicate descriptions are omitted.

A display panel 1001 may include the display area 100, the scan driver 200, the data driver 300, the data distributor 400, a timing controller 501, and an emission driver 600.

The emission driver 600 may supply a light emitting control signal to pixels P through a plurality of light emitting control lines E1 to En based on a fourth control signal ECS. In an exemplary embodiment of the inventive concept, each of the light emitting control lines E1 to En may be connected to the pixels P disposed in a corresponding pixel row.

Figure 8:
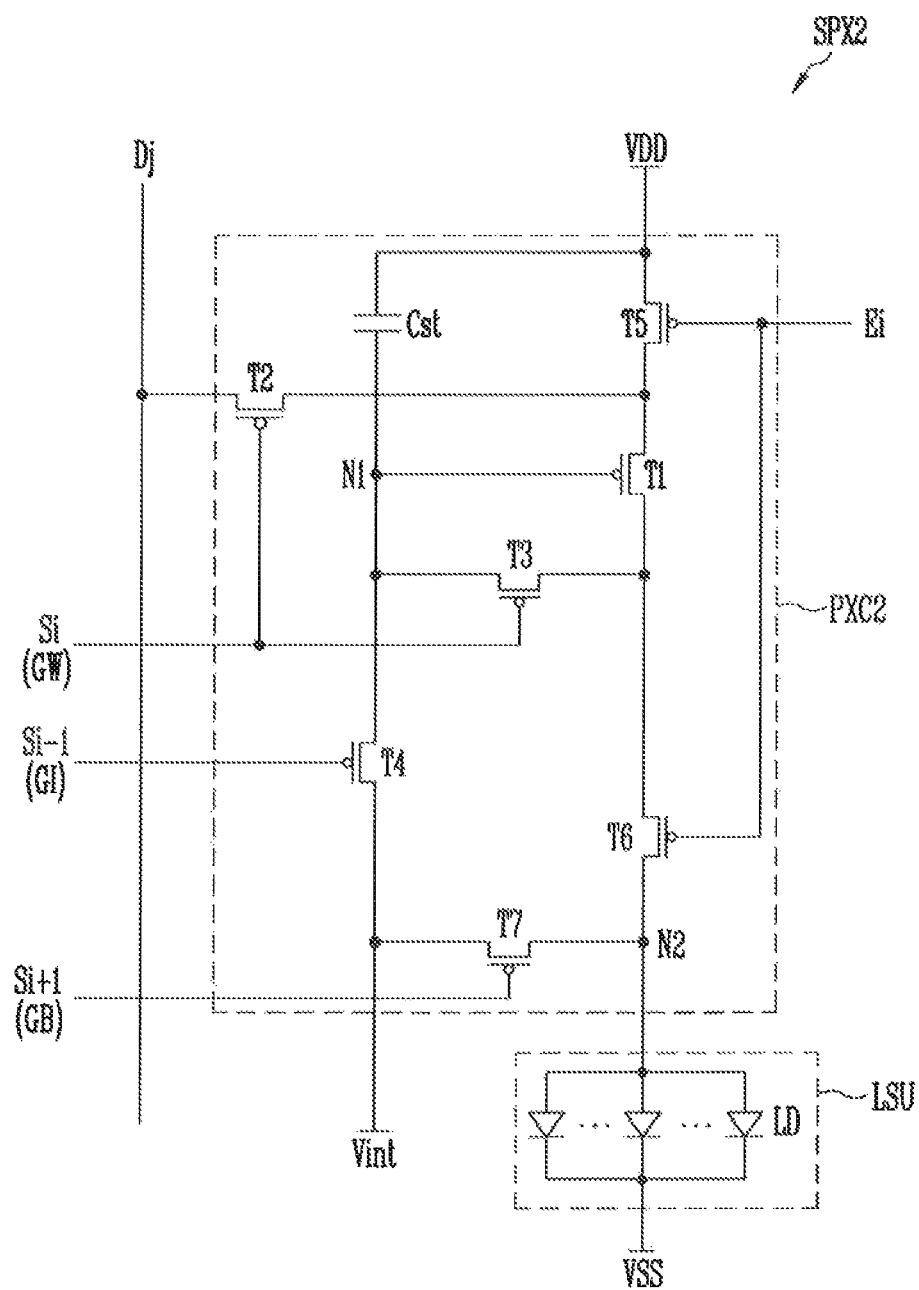
FIG. 8 is a circuit diagram illustrating a pixel included in the display panel of FIG. 7 according to an exemplary embodiment of the inventive concept.

FIG. 8 is a circuit diagram illustrating a pixel included in the display panel of FIG. 7 according to an exemplary embodiment of the inventive concept.

Since the pixel of FIG. 8 is substantially the same as the pixel of FIGS. 2 to 4B except for some configurations of the pixel circuit therein, the same reference numerals are used for the same or corresponding constituent elements, and duplicate descriptions are omitted.

Referring to FIGS. 2, 4B, 7, and 8, a subpixel SPX2 may include the plurality of inorganic light emitting elements LD (or one inorganic light emitting element LD) and a pixel circuit PXC2 connected thereto.

In an exemplary embodiment of the inventive concept, the pixel circuit PXC2 of the subpixel SPX2 disposed in the i-th pixel row may be further connected to the i−1-th scan line Si−1 and/or the i+1-th scan line Si+1. The pixel circuit PXC2 may also be connected to an initialization power supply Vint. According to an exemplary embodiment of the inventive concept, this pixel circuit PXC2 may include first to seventh transistors T1 to T7 and a storage capacitor Cst.

A first transistor T1 is connected between the first power supply VDD and a first electrode of the inorganic light emitting element LD. A gate electrode of the first transistor T1 is connected to a first node N1.

A second transistor T2 is connected between a data line Dj and one electrode of the first transistor T1. A gate electrode of the second transistor T2 is connected to a corresponding scan line Si.

A third transistor T3 is connected between another electrode of the first transistor T1 and the first node N1. A gate electrode of the third transistor T3 is connected to a corresponding scan line Si. When the third transistor T3 is turned on, the first transistor T1 is connected in a diode form.

Here, the scan signal controlling the second and third transistors T2 and T3 may be a write scan signal GW.

A fourth transistor T4 is connected between the first node N1 and the initialization power supply Vint. A gate electrode of the fourth transistor T4 is connected to a previous scan line, for example, the i−1-th scan line Si−1. When the fourth transistor T4 is turned on, a voltage of the initialization power supply Vint may be transferred to the first node N1. Here, the voltage of the initialization power supply Vint may be lower than the lowest voltage of the data signal. A scan signal controlling the fourth transistor T4 may be an initialization scan signal GI.

A fifth transistor T5 is connected between the first power supply VDD and the first transistor T1. A gate electrode of the fifth transistor T5 is connected to a corresponding light emitting control line, for example, an i-th light emitting control line Ei.

A sixth transistor T6 is connected between the first transistor T1 and the first electrode of the inorganic light emitting element LD. A gate electrode of the sixth transistor T6 is connected to a corresponding light emission control line, for example, the i-th light emission control line (Ei).

A seventh transistor T7 is connected between the first electrode of the inorganic light emitting element LD and the initialization power supply Vint. A gate electrode of the seventh transistor T7 is connected to one of next scan lines, for example, the i+1-th scan line Si+1. By turning on the seventh transistor T7, a voltage of the initialization power supply Vint may be supplied to the first electrode of the inorganic light emitting element LD. Here, the scan signal controlling the seventh transistor T7 may be a bypass scan signal GB.

In an exemplary embodiment of the inventive concept, the write scan signal GW, the initialization scan signal GI, and the bypass scan signal GB may be output from different scan drivers, respectively. For example, the scan driver 200 may include a first scan driver that outputs the initialization scan signal GI, a second scan driver that outputs the write scan signal GW, and a third scan driver that outputs the bypass scan signal GB.

Figure 9:
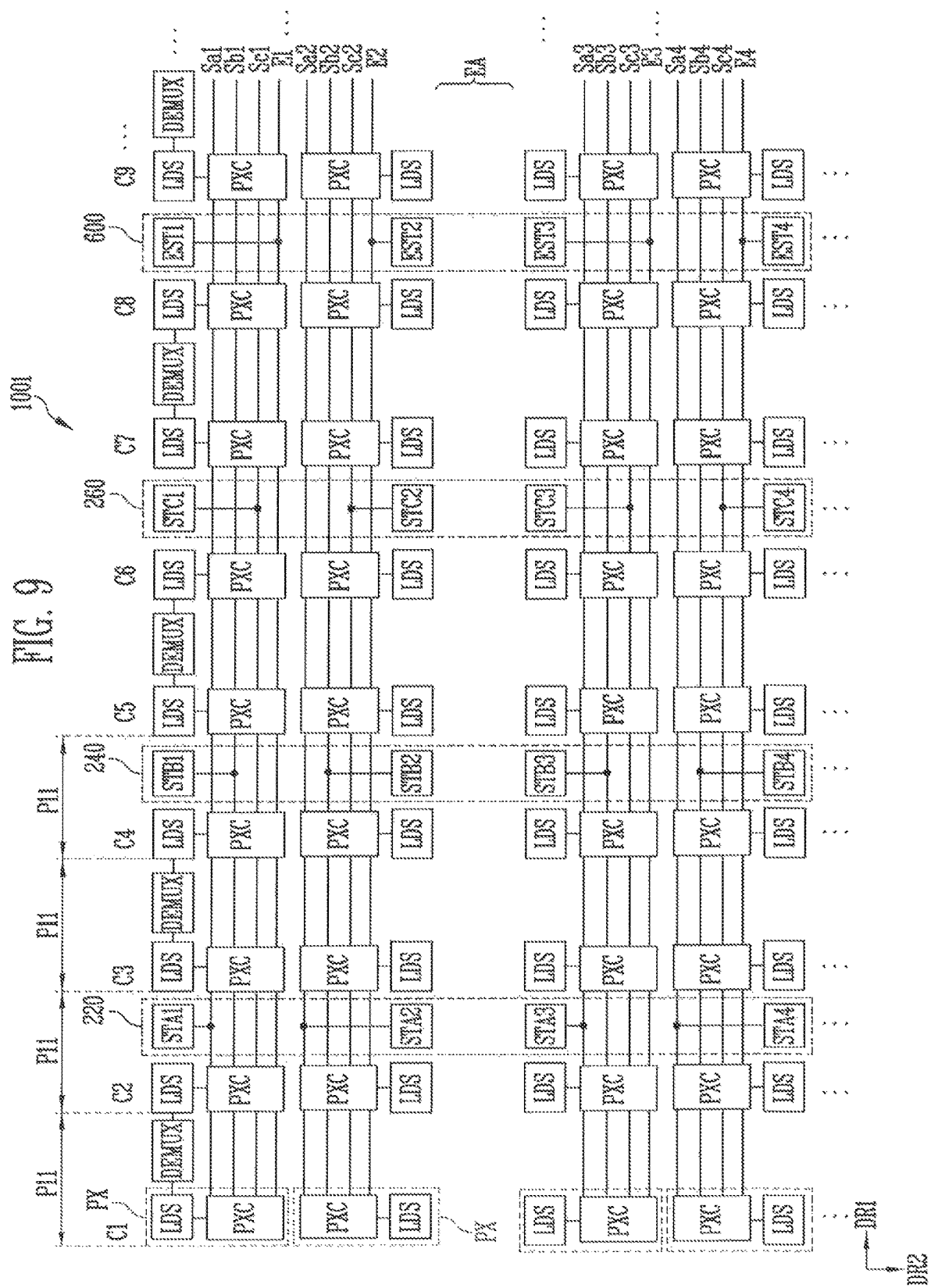
FIG. 9 is a drawing illustrating the display panel of FIG. 7 according to an exemplary embodiment of the inventive concept.

FIG. 9 is a drawing illustrating the display panel of FIG. 7 according to an exemplary embodiment of the inventive concept.

Since the display panel of FIG. 9 is substantially the same as the display panel of FIG. 3 except for configuration of the scan driver, the emission driver, and the pixel circuit therein, the same reference numerals are used for the same or corresponding constituent elements, and duplicate descriptions are omitted.

Referring to FIGS. 3, 7, 8, and 9, the display panel 1001 may include the pixels PX, a data distributor DEMUX, a first scan driver 220, a second scan driver 240, a third scan driver 260, and an emission driver 600.

Each of the pixels PX may include a plurality of subpixels with an inorganic light emitting element LDS and a pixel circuit PXC.

In an exemplary embodiment of the inventive concept, the inorganic light emitting element LDS and the pixel circuit PXC do not overlap each other.

The data distributor DEMUX may be disposed between the 2k−1-th pixel and the 2k-th pixel of the first pixel row R1. In an exemplary embodiment of the inventive concept, the data distributor DEMUX may include a plurality of demultiplexers. The data distributor DEMUX is not disposed between the 2k-th pixel column and the 2k+1-th pixel column due to the disposition described above.

According to the disposition of the data distributor DEMUX, a distance between pixels PX in the first direction DR1 may have a first distance P11.

The first to third scan drivers 220, 240, and 260 and the emission driver 600 may be disposed in some of portions between the pixel columns where the data distributor DEMUX is not disposed. The first to third scan drivers 220, 240, and 260 and the emission driver 600 may be disposed between different pixel columns.

FIG. 9 illustrates that the first scan driver 220 may be disposed between a second pixel column C2 and a third pixel column C3. The second scan driver 240 may be disposed between a fourth pixel column C4 and a fifth pixel column C5, the third scan driver 260 may be disposed between a sixth pixel column C6 and a seventh pixel column C7, and the emission driver 600 may be disposed between an eighth pixel column C8 and a ninth pixel column C9. The disposition of the first to third scan drivers 220, 240, and 260 and the emission driver 600 is not limited thereto.

The first scan driver 220 may include a plurality of stages STA1 to STA4 for outputting the initialization scan signal GI. The initialization scan signal GI may be supplied to the pixel circuits PXC through initialization scan lines Sa1 to Sa4.

The second scan driver 240 may include a plurality of stages STB1 to STB4 for outputting the write scan signal GW. The write scan signal GW may be supplied to the pixel circuits PXC through write scan lines Sb1 to Sb4.

The third scan driver 260 may include a plurality of stages STC1 to STC4 for outputting the bypass scan signal GB. The bypass scan signal GB may be supplied to the pixel circuits PXC through bypass scan lines Sc1 to Sc4.

The emission driver 600 may include a plurality of stages EST1 to EST4 for outputting a light emitting control signal. The light emitting control signal may be supplied to the pixel circuits PXC through light emitting control lines E1 to E4.

In an exemplary embodiment of the inventive concept, the 2k−1-th scan lines, the 2k-th scan lines, the 2k−1-th light emitting control lines, and the 2k-th light emitting control lines may extend between the inorganic light emitting elements LDS of the 2k−1-th pixel row and the inorganic light emitting elements LDS of the 2k-th pixel row in the first direction DR1.

In an exemplary embodiment of the inventive concept, in a first region EA which is a region in which the pixel circuits PXC are not disposed among regions between adjacent pixel rows, a power line (referred to FIG. 3) supplying power for driving the pixel PX may be disposed along the first direction DR1.

As described above, the dead space may be minimized since the data distributor DEMUX, the first to third scan drivers 220, 240, and 260 and the emission driver 600 are disposed between the pixels PX, and the pixels PX (e.g., the inorganic light emitting elements LDS) of the plurality of display panels 1000 connected to one another may be disposed at regular intervals regardless of the boundary of the display panel 1001. Therefore, image deviation may be minimized and a bezel and a connection portion (e.g., a boundary portion) between the display panels 1000 may not be recognized.

Figure 10:
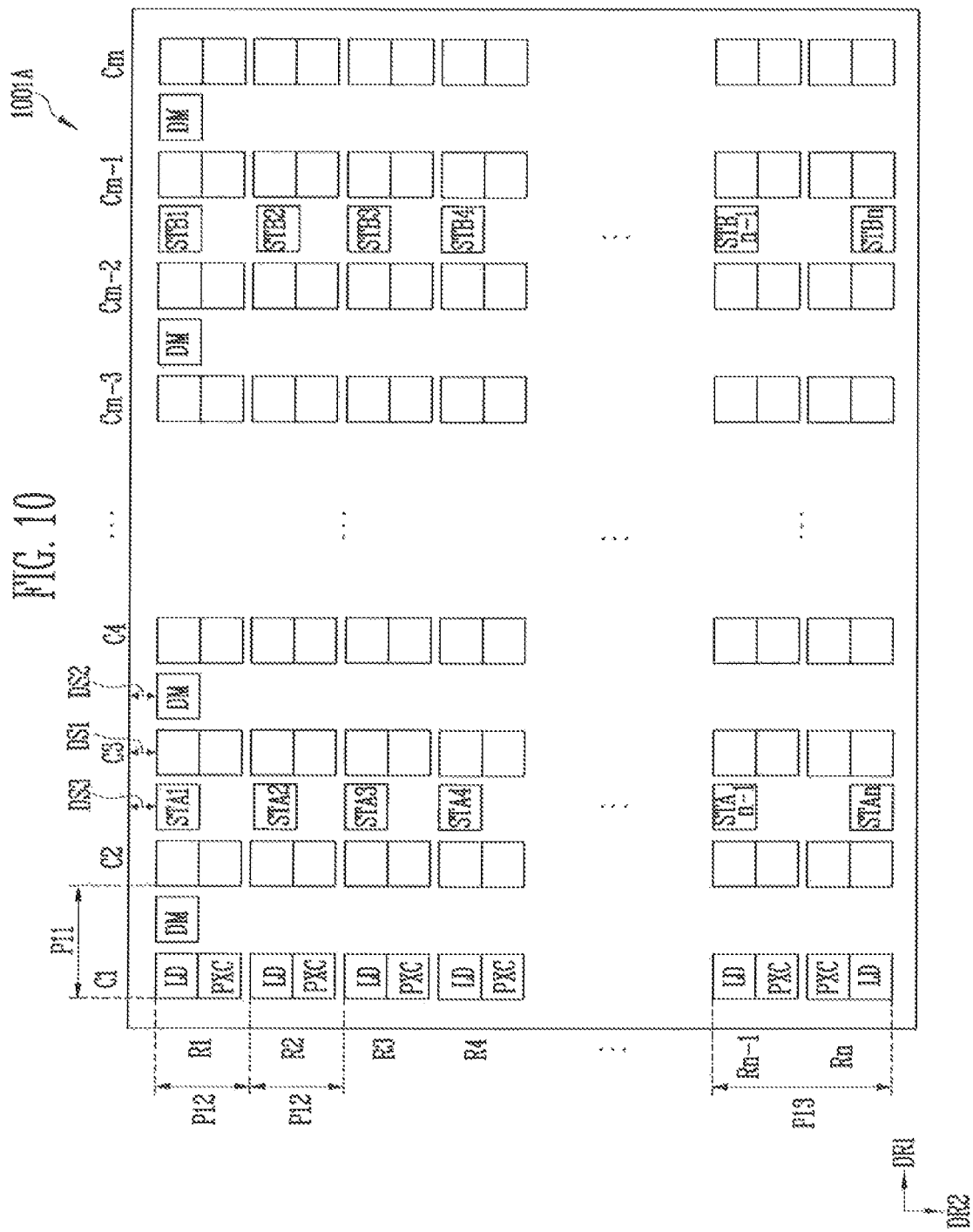
FIG. 10 is a drawing illustrating the display panel of FIG. 7 according to an exemplary embodiment of the inventive concept.

FIG. 10 is a drawing illustrating the display panel of FIG. 7 according to an exemplary embodiment of the inventive concept.

Since a display panel 1001A of FIG. 10 is substantially the same as the display panel of FIG. 9 except for the disposition of the pixel circuit therein, the same reference numerals are used for the same or corresponding constituent elements, and duplicate descriptions are omitted.

Referring to FIGS. 3, 7, 8, 9, and 10, the display panel 1001A may include the pixels PX, a data distributor DM, the first scan driver 220, the second scan driver 240, the third scan driver 260, and the emission driver 600.

A distance between the pixels PX in the first direction DR1 may be the first distance P11 due to the disposition of the data distributor DM.

In an exemplary embodiment of the inventive concept, a distance DS2 between an upper boundary of the display panel 1001A and the data distributor DM may be shorter than or equal to a distance DS1 between the upper boundary of the display panel 1001A and the pixel PX of the first pixel row R1. In addition, a distance DS3 between the upper boundary of the display panel 1001A and the first stage STA1 of the scan driver 200 may be shorter than or equal to the distance DS1 between the upper boundary of the display panel 1001A and the pixel PX of the first pixel row R1.

The inorganic light emitting element LD and pixel circuit PXC do not overlap each other. In an exemplary embodiment of the inventive concept, the pixel circuit PXC of the pixels PX corresponding to some pixel rows may be disposed at the lower side of the inorganic light emitting element LD. In this case, a distance in the second direction DR2 may be the second distance P12.

The pixel circuit PXC of the pixels PX corresponding to some pixel rows may be disposed at the upper side of the inorganic light emitting element LD. In an exemplary embodiment of the inventive concept, the pixel circuits PXC of the last or bottom pixel row, for example, the n-th pixel row, may be disposed at the upper side of the inorganic light emitting elements LD of the n-th pixel row. Therefore, a dead space at the lower side of the display panel 1001A may be reduced. A distance between the pixels PX corresponding to the n-th pixel row Rn in the second direction DR2 may be a third distance P13. In addition, the third distance P13 may be larger than the second distance P12.

As described above, the dead space may be minimized since the data distributor DM, the first to third scan drivers 220, 240, and 260, and the emission driver 600 are disposed between the pixels PX, and the pixels PX (e.g., the inorganic light emitting elements LD) of the plurality of display panels 1001A connected to each other may be disposed at regular intervals regardless of the boundary of the display panel 1001A. Therefore, image deviation may be minimized and a bezel and a connection portion (e.g., a boundary portion) between the display panels 1001A may not be recognized.

Thus, according to exemplary embodiments of the inventive concept, a tiled display device may include a plurality of display panels in which a data distributor, a scan driver, and pixel circuits are disposed between predetermined pixels (or between light emitting element groups). Therefore, a dead space outside a display area may be minimized.

Light emitting elements may be arranged in regular patterns of substantially equal intervals on the plurality of display panels which are continuously connected to one another, so that image deviation may be minimized and a bezel and a connection portion (e.g., a boundary portion) between the plurality of display panels may not be recognized.

While the inventive concept has been shown and described with reference to exemplary embodiments thereof, it will be understood by those of ordinary skill in the art that various changes in form and details may be made thereto without departing from the spirit and scope of the inventive concept as set forth by the appended claims.

What is claimed is:

1. A tiled display device comprising:
an array comprising a plurality of display panels, wherein each of the plurality of display panels includes:
a plurality of pixels forming a plurality of pixel columns arranged in a first direction and a plurality of pixel rows arranged in a second direction, wherein each of the plurality of pixels includes a pixel circuit and an inorganic light emitting element connected to the pixel circuit; and
a row driver disposed between two adjacent pixel columns among the pixel columns,
wherein the pixel circuit of each of the plurality of pixels of an n-th pixel row is disposed closer to an n−1-th pixel row than the inorganic light emitting element of each of the plurality of pixels of the n-th pixel row, where n is a natural number greater than 1.

2. The tiled display device of claim 1, wherein the row driver includes a plurality of stages connected to the plurality of pixel rows, respectively.

3. The tiled display device of claim 2, wherein the row driver includes a scan driver having the plurality of stages connected to a plurality of scan lines, respectively.

4. The tiled display device of claim 2, wherein the row driver includes an emission driver having the stages connected to emission control lines, respectively.

5. The tiled display device of claim 2, further comprising:
a data distributor including a first demultiplexer and a second demultiplexer,
wherein the data distributor does not overlap a first pixel column and a second pixel column in the second direction,
wherein the first pixel column and the second pixel column are adjacent each other in the first direction, and
wherein the first demultiplexer is connected to the first pixel column and the second demultiplexer is connected to the second pixel column.

6. The tiled display device of claim 5, wherein the row driver and the data distributor are disposed in different columns.

7. The tiled display device of claim 5, wherein the plurality of stages are arranged in the second direction between the second pixel column and a third pixel column adjacent to the second pixel column.

8. The tiled display device of claim 5, wherein the row driver includes a plurality of scan drivers which are disposed between different pixel columns and are connected to different scan lines, and
each of the plurality of scan drivers includes a plurality of stages arranged in the second direction.

9. The tiled display device of claim 8, wherein the row driver includes:
a first scan driver configured to output an initialization scan signal;
a second scan driver configured to output a write scan signal; and
a third scan driver configured to output a bypass scan signal.

10. The tiled display device of claim 5, wherein each of the plurality of pixels includes first to third subpixels that emit first to third colors, respectively.

11. The tiled display device of claim 10, wherein the first demultiplexer includes first to third transistors respectively connected to the first to third subpixels of the first pixel column, and wherein the second demultiplexer includes fourth to sixth transistors respectively connected to the first to third subpixels of the second pixel columns.

12. The tiled display device of claim 10, wherein the pixel circuit and the inorganic light emitting element are included in each of the first to third subpixels.

13. The tiled display device of claim 10, wherein a first pixel circuit corresponding to a 2k−1-th pixel row and a second pixel circuit corresponding to a 2k-th pixel row are disposed between a first inorganic light emitting element corresponding to the 2k−1-th pixel row and a second inorganic light emitting element corresponding to the 2k-th pixel row, where k is a natural number.

14. The tiled display device of claim 13, wherein scan lines connected to the 2k−1-th pixel row and the 2k-th pixel row extend in the first direction between the 2k−1-th pixel row and the 2k-th pixel row.

15. The tiled display device of claim 14, wherein a power line connected to the 2k−1-th pixel row and the 2k-th pixel row extends in the first direction between the 2k-th pixel row and a 2k+1-th pixel row.

16. The tiled display device of claim 14, wherein a power line connected to a 2j−1-th pixel row and a 2j-th pixel row extends in the first direction between a 2j−2-th pixel row and the 2j−1-th pixel row, where j is a natural number greater than 1.

17. The tiled display device of claim 8, wherein the row driver of each of the plurality of display panels further includes:
an emission driver which is disposed between pixel columns other than pixel columns in which the scan drivers are disposed, and is connected to the plurality of pixels.

18. A tiled display device comprising:
an array comprising a plurality of display panels,
wherein each of the plurality of display panels includes:
a plurality of pixels which constitute first to n-th pixel rows and first to m-th pixel columns, wherein each of the plurality of pixels includes a pixel circuit and an inorganic light emitting element connected to the pixel circuit; and
a demultiplexer connected to at least one of a 2k−1-th pixel of an i-th pixel row and a 2k-th pixel of the i-th pixel row,
wherein the pixel circuit of each of the plurality of pixels of the n-th pixel row is disposed closer to the n−1-th pixel row than the inorganic light emitting element of each of the plurality of pixels of the n-th pixel row, and
wherein n and m are natural numbers, i is a natural number less than or equal to n, and k is a natural number less than or equal to m/2.

19. The tiled display device of claim 18, wherein transistors included in the pixel circuit and the inorganic light emitting element do not overlap each other, and
wherein pixel circuits corresponding to a 2k−1-th pixel row and pixel circuits corresponding to a 2k-th pixel row are disposed between inorganic light emitting elements corresponding to the 2k−1-th pixel row and inorganic light emitting elements corresponding to the 2k-th pixel row.

20. The tiled display device of claim 18, further comprising:
a scan driver including a plurality of stages arranged in a column direction between a 2k-th pixel column and a 2k+1-th pixel column.

* * * * *